May 21, 1957  D. M. KING  2,792,953
MECHANICAL HANDLING MECHANISMS OR DEVICES
Filed Dec. 8, 1953  2 Sheets-Sheet 1
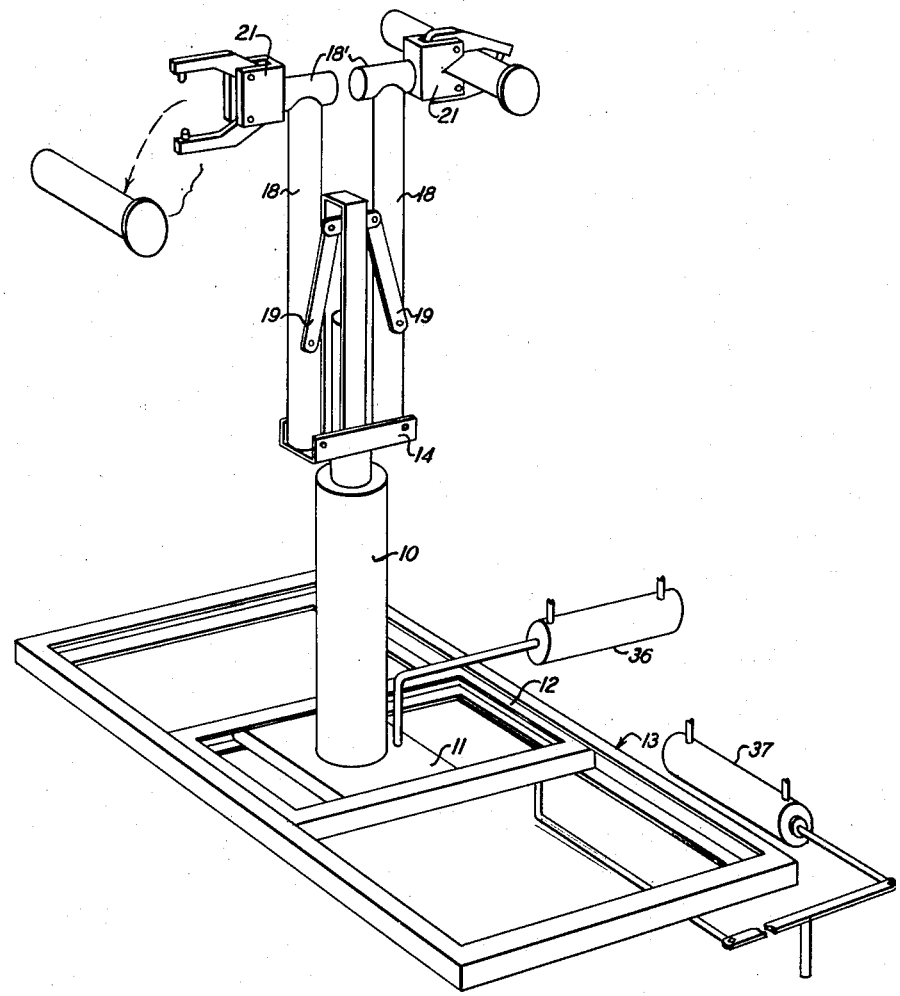
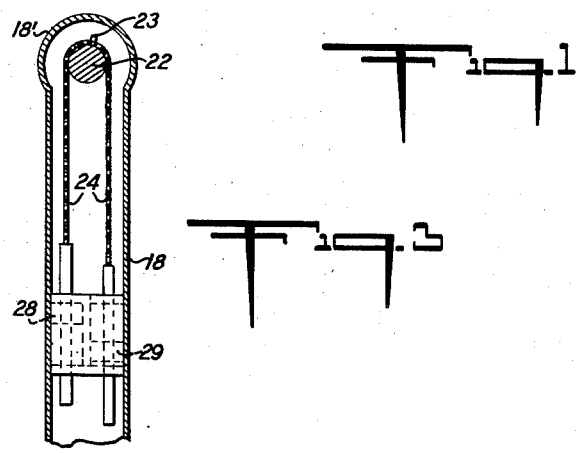

May 21, 1957 D. M. KING 2,792,953
MECHANICAL HANDLING MECHANISMS OR DEVICES
Filed Dec. 8, 1953 2 Sheets-Sheet 2
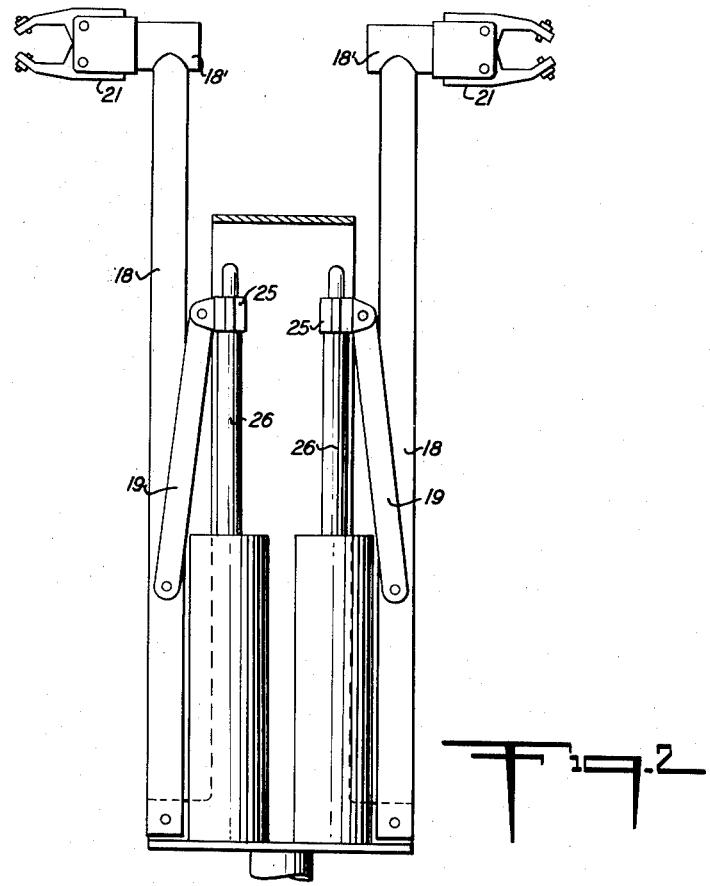
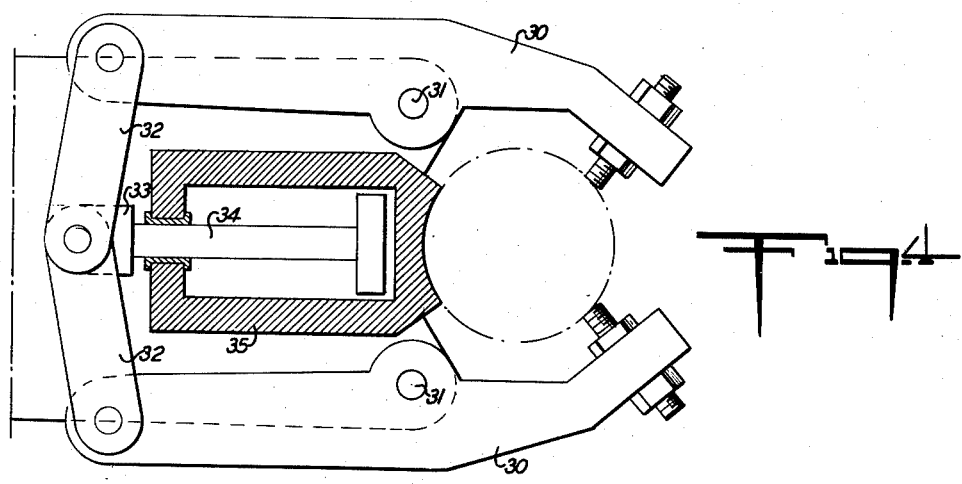

United States Patent Office 2,792,953
Patented May 21, 1957

2,792,953
MECHANICAL HANDLING MECHANISMS OR DEVICES

Donald Mayer King, Stevenage, England

Application December 8, 1953, Serial No. 396,987

8 Claims. (Cl. 214—146.5)

This invention relates to mechanical handling mechanisms or devices and has for one of its objects to evolve such a mechanism which is capable of transferring one or more articles or pieces from one position to another and if necessary of re-orientating such article or piece during or subsequently to the transfer operation. For example, the mechanism may be employed for transferring articles such as forgings from a conveyor to a machine tool, such articles being carried by the conveyor in a vertical position and being transferred by the mechanism into a horizontal or other position, such that it may be accommodated on the tool for treatment thereby. Similarly, the mechanism may be employed for transferring an article from a machine tool after a machining operation back to a conveyor.

According to the invention, the mechanism comprises a carrier member capable of vertical adjustment and in addition of traverse motions in a plane at right angles to its longitudinal axis, an element associated with said carrier member in such a manner as to be capable of rotary or angular movement relatively thereto, one or more arms or the like associated with said element, a grab or other device associated with the or each arm and means whereby controlled movements may be imparted to all or certain of the various parts to cause the grab or other device to perform preselected functions and/or to move in a predetermined path or paths.

In order that the said invention may be clearly understood, the same will be hereinafter more fully described with reference to the accompanying diagrammatic drawings, in which:

Figure 1 is a perspective view of a device for transferring workpieces from a conveyor to a machine tool and vice versa; and Figures 2, 3 and 4 indicate constructional details which may be incorporated in the device shown in Figure 1.

Referring to the drawings, 10 denotes a vertical column which is mounted on a slide 11, the latter being so supported in a carriage 12 as to be capable of transverse movement. The carriage 12 is movable longitudinally or lengthwise of a base frame 13 so that the column 10 will be capable of traverse movement in two directions at right angles and may be caused to occupy any position inside a rectangle the area of which is in this case defined by the frame 13. The traverse motions i. e. the transverse movements of the slide 11 relatively to the carriage 12 and the longitudinal movement of said carriage relatively to the frame 13 are imparted through the medium of ram and cylinder assemblies, indicated diagrammatically at 36 and 37 respectively. The supply of pressure fluid to one or other side of each ram to effect movement of the slide or the carriage may be effected in any known manner. The column 10 is adapted to form the cylinder for a main ram the position of the latter being adjustable vertically within predetermined limits.

Associated with the ram disposed in the column is a rotary head or the like 14 which in the embodiment illustrated is capable of angular movement about the vertical or longitudinal axis of the column. If desired, the arrangement may be such that the head will be capable of an angular movement about an axis inclined to the vertical. The angular setting of the head may be effected as a result of operation of the main ram, the requisite rotary motion being obtained through the medium of any suitable means such, for example, as is indicated in Figure 2. Referring now to that figure it will be seen that the head 14 is carried by a coarse lead screw 15 which co-operates with a nut 16, the latter being supported for limited sliding movement in and relatively to the column 10 and being associated with a ram 17 which is disposed within said column. It will be appreciated that axial movement of the nut 16 resultant upon movement of the ram 17 will result in a rotational movement of the head 14.

Hingedly mounted on the rotary head 14 are two arms 18. The angular setting of the arms 18 in relation to the head 14 and/or to each other may be varied as required through the medium of hinged struts 19 each of which is pivotally connected at one end to an arm 18 and at the other to a crosshead 25 associated with a further hydraulically operated ram 26, said latter rams each being disposed within a cylinder 27 carried by said head 14.

At that end of each arm 18 remote from the rotary head 14 a pincer type grab device, designated generally by 21, is provided, such device being so mounted as to be capable of rotary or angular motion about an axis, which is at right angles to the longitudinal axis of the arm 18. Each grab device 21 may be carried by a stub shaft rotatably journalled in a casing or the like 18 located at the upper end of the appropriate arm 18. One method of imparting a rotary movement to the shaft carrying the device 21 is illustrated in Figure 3, wherein 22 designates the shaft which is provided with a radially directed peg or the like 23, the latter being adapted to engage a chain 24, the ends of which are coupled to two rams 28 and 29 which are adapted to be operated alternately are housed in the arm 18. It will be appreciated on reference to Figure 3 that downward movement of the ram 28 attached to one end of the chain 24 will result in an anti-clockwise movement of the shaft 22 while downward movement of the other ram 29 will result in a clockwise movement of said shaft. The jaws of each grab device 21 may be operated through the medium of a toggle mechanism which may in turn be actuated by a ram. Such an arrangement is shown in Figure 4 wherein 30 denotes the pincer jaws of the grab device, each of such jaws being mounted for pivoted movement about a fixed pivot 31. At the rear ends the jaws 30 are coupled by means of pivoted links 32 to a cross head 33 carried by a ram 34 slidable within a cylinder 35. The arrangement is such that pressure fluid may be supplied to the cylinder through ports (not shown) so that axial movement may be imparted to the ram in either direction as required. With the ram 34 in the forward position as shown in Figure 4 the jaws 30 will be caused to engage the work while when said ram is retracted the links 32 will be effective to cause relatively outward pivoted movement of said jaws thereby to release the work.

To illustrate the function of the mechanism described above, the transfer of work pieces, e. g. crank shafts from a conveyor to a machine tool and the reverse will now be considered. In the arrangement illustrated in Figure 1 it will be seen that the centre of gravity of the work piece designated X is higher when on the conveyor Y than when on the machine tool at Z and also that when on the conveyor, the centre of gravity of said piece will lie in a vertical plane which is parallel to a vertical plane passing through its centre of gravity when in position in the machine tool both planes being perpendicular to the axis of said tool. Furthermore, it will be seen that the longitudinal axis of the piece will be vertical when on the conveyor and horizontal when in position on the machine tool.

If it is assumed that the direction of travel of the conveyor and the axis of the tool are parallel then the mechanism will operate in the following manner, to effect transfer of the piece from the former to the latter:

The carriage 12 will be traversed in a path parallel to the direction of movement of the conveyor and at the same speed as the latter. The main ram in the column 10 will be raised until the grab device 21 carried by one of the arms 18 is at a suitable level to engage the work piece. At a convenient time, the slide 11 carrying the vertical column will be traversed laterally towards the conveyor, the grab device being appropriately positioned, i. e. by rotary movement of the latter, to engage the piece which, as indicated by dotted lines depends vertically from the conveyor. On engagement of the piece by the grab device, the traverse motion of the slide 11 will be stopped and the main ram will be raised sufficiently in order that said piece may be lifted clear of the load carrying hook on the conveyor, whereafter a reverse motion will be imparted to said slide 11. Thus far the piece has been removed from the conveyor with its longitudinal axis vertically disposed but by suitable rotary movement of the grab device 21 said piece may be re-orientated to bring it into a horizontal position as shown in full lines in Figure 1 so that it may be appropriately positioned on the machine tool. By one or more suitable traverse motions of the slide 11 and carriage 12 and by appropriate rotary motion of the head 12 and movement of the arm 18, the piece may then be brought into a suitable position for loading into the machine tool whereafter said grab device may be disengaged from said piece and the mechanism withdrawn ready for a further transfer operation. It will be appreciated that by reversing the sequence outlined above, a machined piece may be unloaded from the machine tool and transferred to a conveyor. In a case, such as that illustrated, where the mechanism incorporates two arms 18, each with a grab device, one of said arms may be employed for transfer in one direction, i. e. from conveyor to tool and the second for transfer in the opposite direction, i. e. from tool to conveyor. Time may be saved if, while one piece is being machined, another is taken from the conveyor by the or another arm and the mechanism replaced in position ready to unload the machine tool. The machine piece may be unloaded, and the unmachined piece placed in the machine tool immediately before loading the machined piece on to the conveyor.

A mechanism such as is indicated may obviously be employed for many purposes other than that indicated, i. e. the transfer of work pieces from or to a conveyor and to or from a machine tool. Furthermore, instead of providing a pincer type grab device at the end of the or each arm, any other device capable of holding a load, a tool or other article may readily be substituted. For example, it may be feasible so as to adapt the mechanism that it may be employed on assembly lines for the purposes of applying bolts or the like to nuts and for tightening the same.

I claim:

1. A mechanical handling device for transferring articles from one position to another comprising a base frame, a carriage supported on and movable relatively to said base frame, a slide supported on said carriage and movable relatively thereto in a direction at right angles to that of movement of the carriage, an upstanding column mounted on said slide, a member supported by and movable upwardly and downwardly relatively to said column, at least one arm associated with said member and capable of pivotal movement about an axis at right angles to the longitudinal axis of said member, means for moving said arm angularly about its pivot and load engaging means mounted on said arm.

2. A mechanical handling device for transferring articles from one position to another comprising a base frame, a carriage supported on and movable relatively to said base frame, a slide supported on said carriage and movable relatively thereto in a direction at right angles to that of movement of the carriage, an upstanding column mounted on said slide, a member supported by and movable upwardly and downwardly relatively to said column, a rotatable head mounted at the upper end of said member, at least one arm pivotally connected at end to said head, means for moving said arm angularly about its pivot point and load engaging means mounted at the free end of said arm.

3. A mechanical handling device for transferring articles from one position to another comprising a base frame, a carriage supported on and movable relatively to said base frame, a slide supported on said carriage and movable relatively thereto in a direction at right angles to that of movement of the carriage, an upstanding column mounted on said slide, a member supported by and movable upwardly and downwardly relatively to said column, a rotatable head mounted at the upper end of said member, at least one arm pivotally connected at one end to said head, means for moving said arm angularly about its pivot and a load gripping device rotatably mounted at the face end of said arm.

4. A mechanical handling device for transferring articles from one position to another comprising a base frame, a carriage supported on and movable relatively to said frame, a slide supported on said carriage and movable relatively thereto in a direction at right angles to that of movement of the carriage, an upstanding column mounted on said slide, a member supported by and movable upwardly and downwardly relatively to said column, a rotatable head mounted at the upper end of said member, at least one arm pivotally connected at one end to said head, a link pivotally connected at one end to said arm at a point intermediate the ends thereof, a hydraulic ram also mounted on said head, and operatively connected to the other end of said link so that on operation of said ram angular movement will be imparted to said arm and a load gripping device rotatably mounted at the free end of said arm.

5. A mechanical handling device for transferring articles from one position to another such device comprising a base frame, a carriage supported on and movable relatively to said frame, a slide supported on said carriage and movable relatively thereto in a direction at right angles to that of movement of the carriage, an upstanding column mounted on said slide, a member supported by and movable upwardly and downwardly relatively to said column, a rotatable head mounted at the upper end of said member, at least one arm pivotally connected at one end to said head, a link pivotally connected at one end to said arm at a point intermediate the ends thereof, a hydraulic ram also mounted on said head and operatively connected to the other end of said link so that on operation of said ram angular movement will be imparted to said arm, a pincer grab device rotatably mounted at the free end of said arm and means for actuating said grab device to cause the same to assume a work gripping or work releasing position.

6. A mechanical handling device for transferring articles from one position to another such device comprising a base frame, a carriage supported on and movable relatively to said frame, a slide supported on and movably relatively to said carriage in a direction at right angles to that of movement of the carriage, a vertically acting hydraulic ram and cylinder assembly mounted on said slide, a rotatable head mounted on the upper end of said ram, at least one arm pivotally connected at one end to said head, a link pivotally connected to said arm at a point intermediate the ends thereof, a hydraulic ram also mounted on said head and operatively connected to said link so that on operation of said ram angular movement will be imparted to said arm, a pincer grab device mounted at the free end of said arm for rotation about an axis at right angles to the longitudinal axis of the arm, means for imparting rotational movements to said grab device and means for actuating the latter to cause the same to assume a work gripping or work releasing position.

7. A mechanical handling device as in claim 6 and further comprising a first hydraulic means for effecting movement of the carriage and a second hydraulic means for moving the slide relatively to said carriage.

8. A mechanical handling device as in claim 6 and wherein the means for imparting rotational movement to the grab device comprise hydraulically operated means and wherein said grab device comprises a pair of pivoted jaw members, a toggle mechanism associated with said jaw members and hydraulically operated means for actuating said toggle mechanisms thereby to actuate said jaw members.

References Cited in the file of this patent
UNITED STATES PATENTS

| | | |
|---|---|---|
| 2,374,045 | Soucia | Apr. 17, 1945 |
| 2,672,990 | Sundin | Mar. 23, 1954 |